UNITED STATES PATENT OFFICE.

ALBERT ANGELL, OF EAST ORANGE, NEW JERSEY, ASSIGNOR TO CHARLES F. A. HINRICHS, OF BROOKLYN, NEW YORK.

IMPROVEMENT IN LAMP-WICKS.

Specification forming part of Letters Patent No. 183,036, dated October 10, 1876; application filed May 24, 1876.

*To all whom it may concern:*

Be it known that I, ALBERT ANGELL, of East Orange, in the county of Essex and State of New Jersey, have invented a new and useful Improvement in Non-Combustible Lamp-Wicks, which improvement is fully set forth in the following specification:

This invention relates to a lamp-wick the principal ingredient of which is mineral wool, which is mixed with any suitable refractory cement, such as a solution of liquid glass, to form a plastic mass, which can be molded or otherwise brought into the required form. If desired, asbestus or other refractory fibrous material may be added to the mineral wool. The material which forms the principal ingredient of my lamp-wick, and which is termed "mineral wool," is obtained by causing a blast or jet of steam or air to impinge upon the surface of molten slag, which is thereby blown into filaments producing the material desired. This material forms an article of commerce, and it has absorbent properties similar to those of fibrous materials obtained from animal or vegetable substances, while at the same time said mineral wool is practically non-combustible, or at least capable of resisting very high temperature without undergoing any change in its nature.

In order to produce lamp-wicks from this mineral wool, I mix the same with a refractory cement, such as a solution of soluble glass in the proper proportion to form a plastic mass, which can be pressed, molded, or rolled into the required form or shape.

In practice, I prefer to make my non-combustible lamp-wicks in the form of short heads which fit the mouth of the wick-tube, and which rest upon a packing of cotton or other fibrous material, by means of which the burning fluid is raised to the non-combustible head. If desired, however, my refractory wick may be made of sufficient length to extend through the wick-tube into the oil-cistern.

In producing the compound for my refractory wick I sometimes mix with the mineral wool some asbestus; but such is not essential for the success of the result desired.

What I claim as new, and desire to secure by Letters Patent, is—

A non-combustible lamp-wick, made of mineral wool and mixed with a refractory cement, substantially as described.

In testimony that I claim the foregoing I have hereunto set my hand and seal this 22d day of May, 1876.

ALBERT ANGELL. [L. S.]

Witnesses:
W. HAUFF,
E. F. KASTENHUBER.